(12) United States Patent
Mai

(10) Patent No.: US 12,260,024 B2
(45) Date of Patent: Mar. 25, 2025

(54) INTERACTION METHOD, ELECTRONIC DEVICE, AND INTERACTION SYSTEM

(71) Applicant: HUAWEI TECHNOLOGIES CO., LTD., Guangdong (CN)

(72) Inventor: Ruikai Mai, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/547,920

(22) PCT Filed: Dec. 22, 2021

(86) PCT No.: PCT/CN2021/140534
§ 371 (c)(1),
(2) Date: Aug. 25, 2023

(87) PCT Pub. No.: WO2022/179279
PCT Pub. Date: Sep. 1, 2022

(65) Prior Publication Data
US 2025/0021167 A1    Jan. 16, 2025

(30) Foreign Application Priority Data
Feb. 26, 2021   (CN) .......................... 202110218458.4

(51) Int. Cl.
*G06F 3/01* (2006.01)
*G06F 3/0346* (2013.01)
(Continued)

(52) U.S. Cl.
CPC .............. *G06F 3/017* (2013.01); *G06F 3/014* (2013.01); *G06F 3/0346* (2013.01); *G06F 3/038* (2013.01);
(Continued)

(58) Field of Classification Search
CPC ........ G06F 3/017; G06F 3/014; G06F 3/0346; G06F 3/038; G06F 3/04815;
(Continued)

(56) References Cited

U.S. PATENT DOCUMENTS

| 11,137,908 | B2* | 10/2021 | Wang | G06F 3/011 |
| 11,270,515 | B2* | 3/2022 | Beith | G06F 3/0487 |
| 2022/0121343 | A1* | 4/2022 | Ratter | G06T 5/94 |

FOREIGN PATENT DOCUMENTS

WO    2017021902 A1   2/2017

* cited by examiner

*Primary Examiner* — Jonathan A Boyd
(74) *Attorney, Agent, or Firm* — Fish & Richardson P.C.

(57) ABSTRACT

The present disclosure relates to virtual reality interaction methods, devices, and systems. In one example method, a head-mounted display device displays a virtual keyboard. In response to an input trigger operation of a user, a hand-mounted device sends hand detection data to the head-mounted display device based on a detected target sensor signal. After determining, based on the hand detection data, that an input trigger event occurs, the head-mounted display device determines an initial tap position of a target finger relative to the virtual keyboard based on a hand image captured by a camera. The hand-mounted device sends hand motion tracking data collected by a motion sensor to the head-mounted display device. In response to an input completion operation of the user, the head-mounted display device determines and displays an input result based on the initial tap position and the hand motion tracking data.

20 Claims, 7 Drawing Sheets

(51) Int. Cl.
*G06F 3/038* (2013.01)
*G06F 3/04815* (2022.01)
*G06T 7/246* (2017.01)

(52) U.S. Cl.
CPC .......... *G06F 3/04815* (2013.01); *G06T 7/246* (2017.01); *G06F 2203/0331* (2013.01); *G06F 2203/0384* (2013.01); *G06T 2207/30196* (2013.01); *G06T 2207/30204* (2013.01)

(58) Field of Classification Search
CPC ..... G06F 2203/0331; G06F 2203/0384; G06T 7/246; G06T 2207/30196; G06T 2207/30204
See application file for complete search history.

INTERACTION METHOD, ELECTRONIC DEVICE, AND INTERACTION SYSTEM

CROSS-REFERENCE TO RELATED APPLICATIONS

This application is a National Stage of International Application No. PCT/CN2021/140534, filed on Dec. 22, 2021, which claims priority to Chinese Patent Application No. 202110218458.4, filed on Feb. 26, 2021, both of which are hereby incorporated by reference in their entireties.

TECHNICAL FIELD

This application relates to the field of virtual reality technologies, and in particular, to an interaction method, an electronic device, and an interaction system.

BACKGROUND

With the development of computer graphics technologies and terminal technologies, virtual reality (virtual reality, VR) technologies, augmented reality (augmented reality, AR) technologies, and mixed reality (mixed reality, MR) technologies are increasingly applied to people's life. In a scenario such as VR, AR, or MR, a user may obtain interactive immersive experience in a virtual fusion environment constructed by a head-mounted display (head-mounted display, HMD) device (head-mounted display device for short).

In the virtual environment, the user may interact with the head-mounted display device through a virtual user interface provided by the head-mounted display device. For example, the head-mounted display device may display and render a virtual keyboard, and the user may perform a touch operation on the virtual keyboard to implement gesture input. In a case of sensing the touch operation, a current mainstream solution is to capture a hand image of the user by using a camera on the head-mounted display device, recognize and track a spatial position of a hand key point of the user based on a plurality of frames of consecutive hand images, and then determine the touch operation of the user based on tracked coordinate data. However, in this manner of sensing the touch operation of the user based on the camera to implement gesture input, accuracy of an input recognition result is relatively low due to a reason such as self-blocking of a hand.

SUMMARY

In view of this, this application provides an interaction method, an electronic device, and an interaction system, to improve accuracy of a gesture input recognition result in a scenario of virtual reality.

To achieve the foregoing purpose, according to a first aspect, an embodiment of this application provides an interaction method, applied to an interaction system. The interaction system includes a head-mounted display device and a hand-mounted device. The head-mounted display device has a camera. The hand-mounted device has a motion sensor. The hand-mounted device further has a vibration sensor and/or a pulse wave sensor. The method includes:

displaying, by the head-mounted display device, a virtual keyboard:

in response to an input trigger operation of a user, sending, by the hand-mounted device, hand detection data to the head-mounted display device based on a detected target sensor signal, where the target sensor signal includes a biological vibration wave signal detected by the vibration sensor and/or a pulse wave signal detected by the pulse wave sensor:

after determining, based on the hand detection data, that an input trigger event occurs, determining, by the head-mounted display device, an initial tap position of a target finger relative to the virtual keyboard based on a hand image captured by the camera:

sending, by the hand-mounted device, hand motion tracking data collected by the motion sensor to the head-mounted display device; and in response to an input completion operation of the user, determining and displaying, by the head-mounted display device, an input result based on the initial tap position and the hand motion tracking data.

According to the interaction method provided in this embodiment of this application, the head-mounted display device may display the virtual keyboard, the hand-mounted device may send hand detection data to the head-mounted display device after detecting the target sensor signal, and the head-mounted display device may determine the input trigger event based on the hand detection data, to implement detection of a tap action. The hand-mounted device may further transmit hand motion tracking data of the target finger collected by the motion sensor to the head-mounted display device. The head-mounted display device may capture the hand image of the user by using the camera, and determine and display the input result based on the hand motion tracking data collected by the motion sensor and the hand image. In the foregoing solution, the tap action is detected by using the signal detected by the vibration sensor or the pulse wave sensor, and the input result is determined based on the hand motion tracking data collected by the motion sensor. This can avoid blocking of a hand, and thus improve accuracy of the determined input result. In addition, a sampling frequency of the motion sensor is usually far higher than a frame rate of the camera, and complexity of a signal processing algorithm is relatively low. Therefore, the input result is determined by using a signal collected by the motion sensor. This can also reduce an output delay, and improve real-time experience of gesture input of the user.

In a possible implementation of the first aspect, the hand image includes hand image tracking data collected by the camera, and the determining and displaying an input result based on the initial tap position and the hand motion tracking data includes:

performing data fusion on the hand image tracking data and the hand motion tracking data to obtain motion tracking data of the target finger;

determining the input result based on the initial tap position, the motion tracking data, a keyboard layout of the virtual keyboard, and a preset language model; and displaying the input result.

In the foregoing implementation, the head-mounted display device performs data fusion on the hand image tracking data collected by the camera and hand motion tracking data collected by an IMU, and then determines the input result based on the motion tracking data that is of the target finger and that is obtained through fusion. This can further improve accuracy of the determined input result.

In a possible implementation of the first aspect, the hand image tracking data includes image tracking data of a target part of the target finger or image tracking data of the hand-mounted device. In this case, the head-mounted display device may extract the image tracking data of the target part or the hand-mounted device from the hand image tracking data for determining the input result, to improve processing efficiency.

In a possible implementation of the first aspect, the hand-mounted device is provided with a visual marker, and the hand image tracking data includes image tracking data of the visual marker. In this case, the head-mounted display device may extract the image tracking data of visual marker from the hand image tracking data to determine an input result, to improve processing efficiency.

In a possible implementation of the first aspect, the method further includes: when determining, based on the hand detection data, that the target sensor signal meets a preset requirement, determining, by the head-mounted display device, that the input trigger event occurs. This can improve accuracy of gesture input trigger detection.

In a possible implementation of the first aspect, the hand detection data includes indication information, and the sending hand detection data to the head-mounted display device based on a detected target sensor signal includes:
performing feature extraction on the detected target sensor signal;
when an extracted target signal feature meets a preset requirement, sending the indication information to the head-mounted display device; and
accordingly, when receiving the indication information, determining, by the head-mounted display device, that the target sensor signal meets the preset requirement.

In the foregoing implementation, whether the target sensor signal meets the preset requirement is detected on the hand-mounted device. This can reduce an amount of data transmitted between the hand-mounted device and the head-mounted display device, and further improve transmission efficiency and reduce transmission energy consumption of the hand-mounted device.

In a possible implementation of the first aspect, the method further includes: when determining, based on the hand image captured by the camera, that the input trigger operation acts on the virtual keyboard, determining, by the head-mounted display device, that the input trigger event occurs. This facilitates recognition of a subsequent input result, and can also reduce energy consumption.

In a possible implementation of the first aspect, the method further includes: when determining, based on the hand image captured by the camera, that a hand that is of the user and on which the hand-mounted device is mounted is in a target gesture, determining, by the head-mounted display device, that the input trigger event occurs. This can improve accuracy of gesture input trigger detection.

In a possible implementation of the first aspect, a rendering position of the virtual keyboard is on a physical plane, the input trigger operation is an operation that the target finger taps the virtual keyboard on the physical plane, and the input completion operation is an operation that the target finger moves away from the virtual keyboard on the physical plane.

In a possible implementation of the first aspect, the input trigger operation is an operation of pinching the target finger and a thumb together, and the input completion operation is an operation of moving the target finger and the thumb apart.

In a possible implementation of the first aspect, the rendering position of the virtual key board is in the air. This can improve convenience of user operation.

In a possible implementation of the first aspect, the method further includes: in response to a sliding input operation of the user, sending, by the hand-mounted device, the hand motion tracking data collected by the motion sensor to the head-mounted display device. In this way, the user can input content through the sliding input operation. Therefore, flexibility in performing an input operation by the user can be improved.

In a possible implementation of the first aspect, the hand-mounted device is a finger-mounted device, and the target finger is a finger on which the hand-mounted device is mounted. This facilitates mounting for the user, and motion of the target finger can be better detected. Therefore, accuracy of a detection result can be improved.

In a possible implementation of the first aspect, the vibration sensor and the motion sensor are a same IMU, and the head-mounted display device communicates with the hand-mounted device through a Bluetooth connection.

In the foregoing implementation, the vibration sensor and the motion sensor use a same IMU. This can reduce complexity of a structure of the hand-mounted device, and improve accuracy of the detected hand motion tracking data. The head-mounted display device communicates with the hand-mounted device through the Bluetooth connection. This can reduce power consumption and costs.

According to a second aspect, an embodiment of this application provides an electronic device, including a memory and a processor, where the memory is configured to store a computer program, and the processor is configured to: when invoking the computer program, perform the method performed by the head-mounted display device or the hand-mounted device according to the first aspect.

According to a third aspect, an embodiment of this application provides an interaction system, including a head-mounted display device and a hand-mounted device, where the head-mounted display device has a camera, the hand-mounted device has a motion sensor, the hand-mounted device further has a vibration sensor and/or a pulse wave sensor, the head-mounted display device is configured to perform the method performed by the head-mounted display device according to the first aspect, and the hand-mounted device is configured to perform the method performed by the hand-mounted device according to the first aspect.

According to a fourth aspect, an embodiment of this application provides a computer-readable storage medium, where the computer-readable storage medium stores a computer program, and when the computer program is executed by a processor, the method performed by the head-mounted display device or the hand-mounted device according to the first aspect is implemented.

According to a fifth aspect, an embodiment of this application provides a computer program product, where when the computer program product is run on an electronic device, the electronic device is enabled to perform the method performed by the head-mounted display device or the hand-mounted device according to the first aspect.

According to a sixth aspect, an embodiment of this application provides a chip system, including a processor, where the processor is coupled to a memory, and the processor executes a computer program stored in the memory, to implement the method performed by the head-mounted display device or the hand-mounted device according to the first aspect. The chip system may be a single chip or a chip module including a plurality of chips.

It may be understood that, for beneficial effects of the second aspect to the sixth aspect, refer to related descriptions in the first aspect. Details are not described herein.

DESCRIPTION OF EMBODIMENTS

Figure 1:
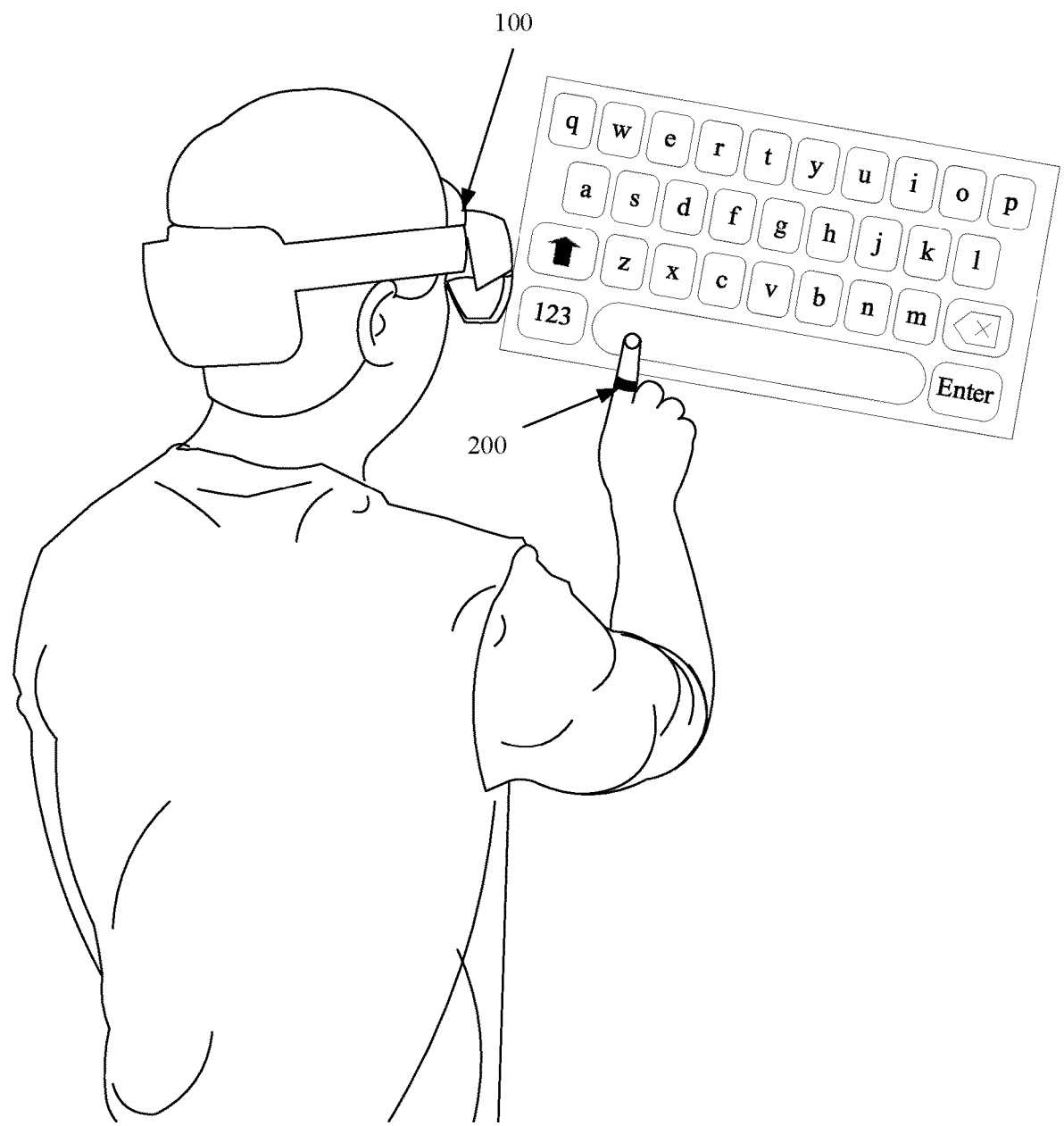
FIG. 1 is a schematic diagram of a system architecture of an interaction system according to an embodiment of this application.

The following describes embodiments of this application with reference to the accompanying drawings in embodiments of this application. Terms used in implementations of embodiments of this application are merely used to explain specific embodiments of this application, but are not intended to limit this application.

To facilitate understanding of the technical solutions in embodiments of this application, the following first explains some terms used in embodiments of this application.

VR: A virtual reality technology is a computer simulation system that can create a virtual world and provide experience of the virtual world. In the technology, a computer is used to generate a simulated environment, so that a user is immersed in the virtual environment and has three-dimensional senses of sight, hearing, touch, and even smell. In addition, the user can perform real-time interaction through a language, a gesture, and the like.

AR: An augmented reality technology is a technology that integrates virtual information with the real world. Information, such as text, an image, a three-dimensional model, music, and a video, generated by a computer is superimposed in the real world by using a plurality of technical means, such as a multimedia technology, a three-dimensional modeling technology, an intelligent interaction technology, and a sensor technology. In this way, digital information and physical information complement each other. This implements "enhancement" of the real world.

MR: A mixed reality technology is a further development of VR and AR technologies. Real scene information is introduced into a virtual environment, so that a bridge for information exchange and feedback is built among a virtual world, a real world, and a user. This enhances reality of user experience. Mixed reality usually uses an optical perspective technology to superimpose virtual images on human eyeballs.

Technologies, such as VR, AR, and MR, related to a virtual environment may be referred to as a virtual reality technology in a broad sense. In some descriptions of this application, the virtual reality technology may be understood in the broad sense.

The technical solutions of this application may be applied to a VR device, an AR device, or an MR device, for example, a head-mounted display device, which is common. In embodiments of this application, the head-mounted display device is used as an example for description.

A digital virtual scene is used in a scenario such as VR, AR, or MR. The virtual scene is usually implemented by using a VR device, an AR device, or an MR device. To provide interactive immersive experience for a user, physical hardware such as a handle or a touchpad, or a manner such as a voice instruction or a gesture operation may be used for user input.

In a specific implementation process of performing input by using a gesture operation, the gesture operation of the user may be obtained by using a sensor system of the device. For example, a hand image of the user in a process of operating the virtual keyboard may be captured by a camera on the head-mounted display device, and a spatial position of a hand key point of the user is segmented, recognized, and tracked based on the captured hand image, and then a touch operation (that is, a gesture operation) of the user on the virtual keyboard is determined based on tracking data. However, in this manner of sensing the touch operation of the user based on the camera, to implement gesture input, a tap action of a finger is prone to be blocked by another part of a hand, for example, the back of the hand, due to a relative position relationship between the camera on the head-mounted display device and the hand of the user. As a result, recognition of the tap action is prone to be wrong or missed. In addition, an algorithm for sensing the touch operation of the user based on the camera is generally complex. The algorithm has a high requirement on computing power, and a relatively long delay cannot meet a requirement for detection of a quick tap action.

Therefore, an embodiment of this application provides an interaction method. A tap action is detected by using a biological vibration signal that is collected by a vibration sensor and that is transmitted along a finger epidermis layer and an adipose layer, and a gesture operation is recognized with reference to hand motion tracking data provided by a motion sensor and a hand image captured by a camera, to improve accuracy and real-time experience of gesture input in a scenario of virtual reality.

The following first describes a system related to embodiments of this application.

FIG. 1 is a schematic diagram of a system architecture of an interaction system according to an embodiment of this application. As shown in FIG. 1, the interaction system may include a head-mounted display device 100 and a hand-mounted device 200.

The head-mounted display device 100 may be a helmet, glasses, or the like. The hand-mounted device 200 may be a finger-mounted device such as a finger ring or a finger cot, or may be an arm-mounted device such as a wristband or an armband. In FIG. 1, the finger-mounted device is used as an example for description.

A short-range communication connection may be established between the head-mounted display device 100 and the hand-mounted device 200, and data interaction is performed through the established short-range communication connection. Technologies for establishing the short-range communication connection include but are not limited to a wireless local area network (wireless local area network. WLAN) (for example, a wireless fidelity (wireless fidelity. Wi-Fi) network), a Bluetooth (Bluetooth. BT) technology, an ultra-wideband (ultra-wideband. UWB) technology, a near field communication (near field communication. NFC) technology, an infrared (infrared. IR) technology, a universal 2.4G/5G frequency band wireless communication technology, and the like. In an embodiment of this application, the short-range communication connection is established between the head-mounted display device 100 and the hand-mounted device 200 by using the Bluetooth technology, to reduce power consumption and costs of development and implementation. In this embodiment of this application, the Bluetooth connection is also used as an example for description subsequently.

The head-mounted display device 100 may provide a virtual environment for user interaction in a manner such as VR, AR, or MR. A user may implement user input in a manner such as voice input or gesture input. The gesture input may include air gesture input and interface-based gesture input (for example, virtual keyboard-based gesture input). For the virtual keyboard-based gesture input, after the short-range communication connection is established between the head-mounted display device 100 and the hand-mounted device 200, hand motion tracking data collected by the hand-mounted device 200 may be obtained, and a gesture operation is recognized based on the obtained hand motion tracking data.

Figure 2:
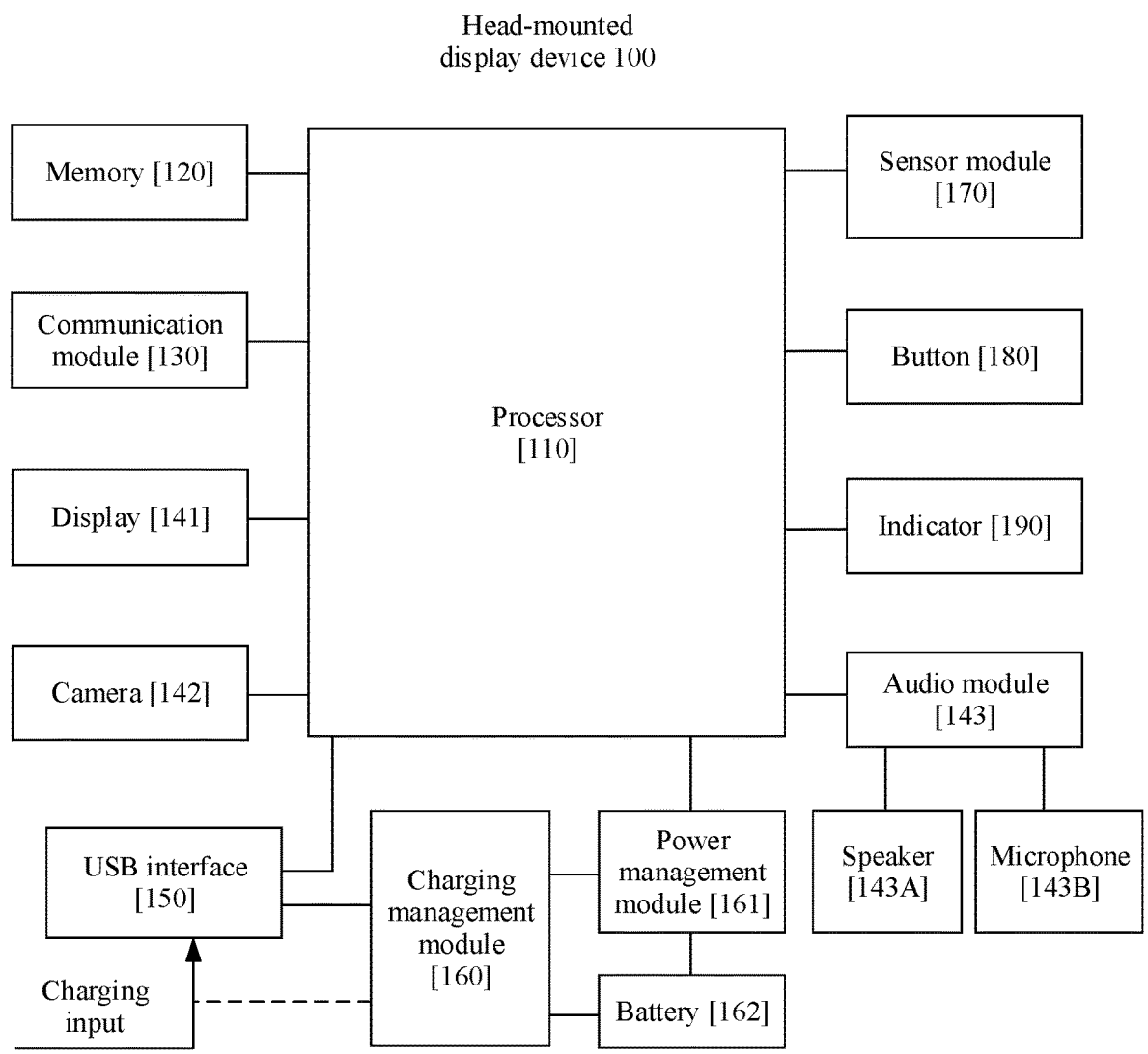
FIG. 2 is a schematic diagram of a functional structure of a head-mounted display device according to an embodiment of this application.

FIG. 2 is a schematic diagram of a functional structure of a head-mounted display device 100 according to an embodiment of this application. As shown in FIG. 2, the head-mounted display device 100 may include a processor 110, a memory 120, a communication module 130, a display 141, a camera 142, an audio module 143, a speaker 143A, a microphone 143B, a universal serial bus (Universal Serial Bus, USB) interface 150, a charging management module 160, a power management module 161, a battery 162, a sensor module 170, a button 180, an indicator 190, and the like.

It may be understood that the structure shown in this embodiment of this application does not constitute a specific limitation on the head-mounted display device 100. In some other embodiments of this application, the head-mounted display device 100 may include more or fewer components than those shown in the figure, or some components may be combined, or some components may be split, or a different component arrangement may be used. The components shown in the figure may be implemented in hardware, software, or a combination of software and hardware.

The processor 110 may include one or more processing units. For example, the processor 110 may include an AP, a modem processor, a GPU, an ISP, a controller, a memory, a video codec, a DSP, a baseband processor, and/or a neural-network processing unit (neural-network processing unit, NPU). Different processing units may be independent components, or may be integrated into one or more processors.

The controller may be a nerve center and a command center of the head-mounted display device 100. The controller may generate an operation control signal based on an instruction operation code and a time sequence signal, to complete control instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor 110 may directly invoke the instructions or the data from the memory. This avoids repeated access, and reduces waiting time of the processor 110. Therefore, system efficiency can be improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output. GPIO) interface, a subscriber identity module (subscriber identity module. SIM) interface, a universal serial bus (universal serial bus. USB) interface, and/or the like.

The memory 120 may be configured to store computer-executable program code, where the executable program code includes instructions. The processor 110 executes various function applications and data processing of the head-mounted display device 100 by running instructions stored in the memory 120. The memory 120 may include a program storage area and a data storage area. The program storage area may store an operating system, an application required by at least one function, and the like. The data storage area may store data (such as image data) created during use of the head-mounted display device 100. In addition, the memory 120 may include a high-speed random access memory, and may further include a non-volatile memory, for example, at least one magnetic disk storage device, a flash memory device, or a universal flash storage (Universal Flash Storage, UFS).

The communication module 130 may provide a wireless communication solution that is applied to the head-mounted display device 100 and the wireless communication solution includes a WLAN (for example, a Wi-Fi network). Bluetooth, a global navigation satellite system (global navigation satellite system. GNSS), frequency modulation (frequency modulation, FM), NFC. IR, or the like. The communication module 130 may be one or more components integrating at least one communication processing module.

The display 141 may be a liquid crystal display (liquid crystal display LCD), an organic light-emitting diode (organic light-emitting diode. OLED), an active-matrix organic light emitting diode (active-matrix organic light emitting diode. AMOLED), a flexible light-emitting diode (flex light-emitting diode. FLED), a Mini LED, a Micro LED, a quantum dot light emitting diode (quantum dot light emitting diode, QLED), or the like.

In some embodiments, the head-mounted display device 100 may have a transparent or semi-transparent display 142, and a user may directly view a physical environment through the display 142. The head-mounted display device 100 may present a virtual environment on the transparent or semi-transparent display 142. The head-mounted display device 100 may alternatively have an opaque display 142. The head-mounted display device 100 may capture an image or a video of a physical environment, combine the captured image or video with a virtual environment, and present a combined image or video on the opaque display 142.

The camera 142 is configured to capture a static image (for example, a physical environment around the device) or a video. An optical image of an object is generated through the lens, and is projected onto a photosensitive element. The photosensitive element may be a charge coupled device (Charge Coupled Device. CCD) or a complementary metal-oxide-semiconductor (Complementary Metal-Oxide-Semiconductor. CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a format such as standard RGB or YUV.

In some embodiments, the head-mounted display device 100 may include one or more cameras 142. Each camera 142 may be a conventional grayscale, RGB monocular camera, or a depth camera (for example, a camera for implementing depth imaging based on binocular parallax, or a camera for implementing depth imaging based on time flight). The head-mounted display device 100 may capture an image or a video of a physical environment by using the one or more cameras 142, to superimpose the physical environment in a virtual environment. Alternatively, a virtual object is superimposed on the physical object based on information such as a position of a physical object in the physical environment that is sensed based on a captured image or video, for example, a virtual keyboard is displayed on a physical surface.

The head-mounted display device 100 may implement an audio function by using the audio module 143, the speaker 143A, the microphone 143B, an application processor, and the like. For example, the head-mounted display device 100 may simulate a sound in a physical environment for playing, or may receive voice information of the user.

The audio module 143 is configured to convert digital audio information into an analog audio signal output, and is further configured to convert an analog audio input into a digital audio signal. The audio module 143 may be further configured to code and decode an audio signal. In some embodiments, the audio module 143 may be disposed in the processor 110, or some function modules in the audio module 143 are disposed in the processor 110.

The speaker 143A, also referred to as a "loudspeaker", is configured to convert an audio electrical signal into a sound signal. The user may listen to audio information by using the speaker 143A.

The microphone 143B, also referred to as a "mike", is configured to convert the sound signal into an electrical signal. During sending of voice information, the user may make a sound by moving a human mouth close to the microphone 143B, to input a sound signal to the microphone 143B. At least one microphone 143B may be disposed in the head-mounted display device 100. In some other embodiments, two microphones 143B may be disposed in the head-mounted display device 100, to collect a sound signal and further implement a noise reduction function. In some other embodiments, three, four, or more microphones 143B may alternatively be disposed in the head-mounted display device 100, to collect a sound signal, implement noise reduction, and recognize a sound source, so as to implement a directional recording function and the like.

The USB interface 150 is an interface that conforms to a USB standard specification, and may specifically be a mini USB interface, a micro USB interface, a USB Type-C interface, or the like. The USB interface 150 may be configured to connect to a charger to charge the head-mounted display device 100, or may be configured to perform data transmission between the head-mounted display device 100 and a peripheral device. The interface may be further configured to connect to another head-mounted display device 100.

The charging management module 160 is configured to receive a charging input from the charger. The charger may be a wireless charger or a wired charger. In some embodiments of wired charging, the charging management module 160 may receive a charging input from the wired charger through the USB interface 150. In some embodiments of wireless charging, the charging management module 160 may receive a wireless charging input through a wireless charging coil of the head-mounted display device 100. When charging the battery 162, the charging management module 160 may further supply power to the terminal device by using the power management module 161.

The power management module 161 is configured to connect to the battery 162, the charging management module 160, and the processor 110. The power management module 161 receives an input of the battery 162 and/or the charging management module 160, and supplies power to the processor 110, the memory 120, the communication module 130, the camera 142, and the like. The power management module 161 may further be configured to monitor parameters such as a battery capacity, a battery cycle count, and a battery health status (electric leakage or impedance). In some other embodiments, the power management module 161 may alternatively be disposed in the processor 110. In some other embodiments, the power management module 161 and the charging management module 160 may alternatively be disposed in a same device.

The sensor module 170 may include a pressure sensor, a gyroscope, an accelerator, a distance sensor, an optical proximity sensor, a fingerprint sensor, a touch sensor, and the like.

The button 180 includes a power button, a volume button, and the like. The button 180 may be a mechanical button, or may be a touch-sensitive button. The head-mounted display device 100 may receive a button input, and generate a button signal input related to a user setting and function control of the head-mounted display device 100.

The indicator 190 may be an indicator light, and may be configured to indicate a charging status and a power change, or may be configured to indicate a message, and the like.

Figure 3:
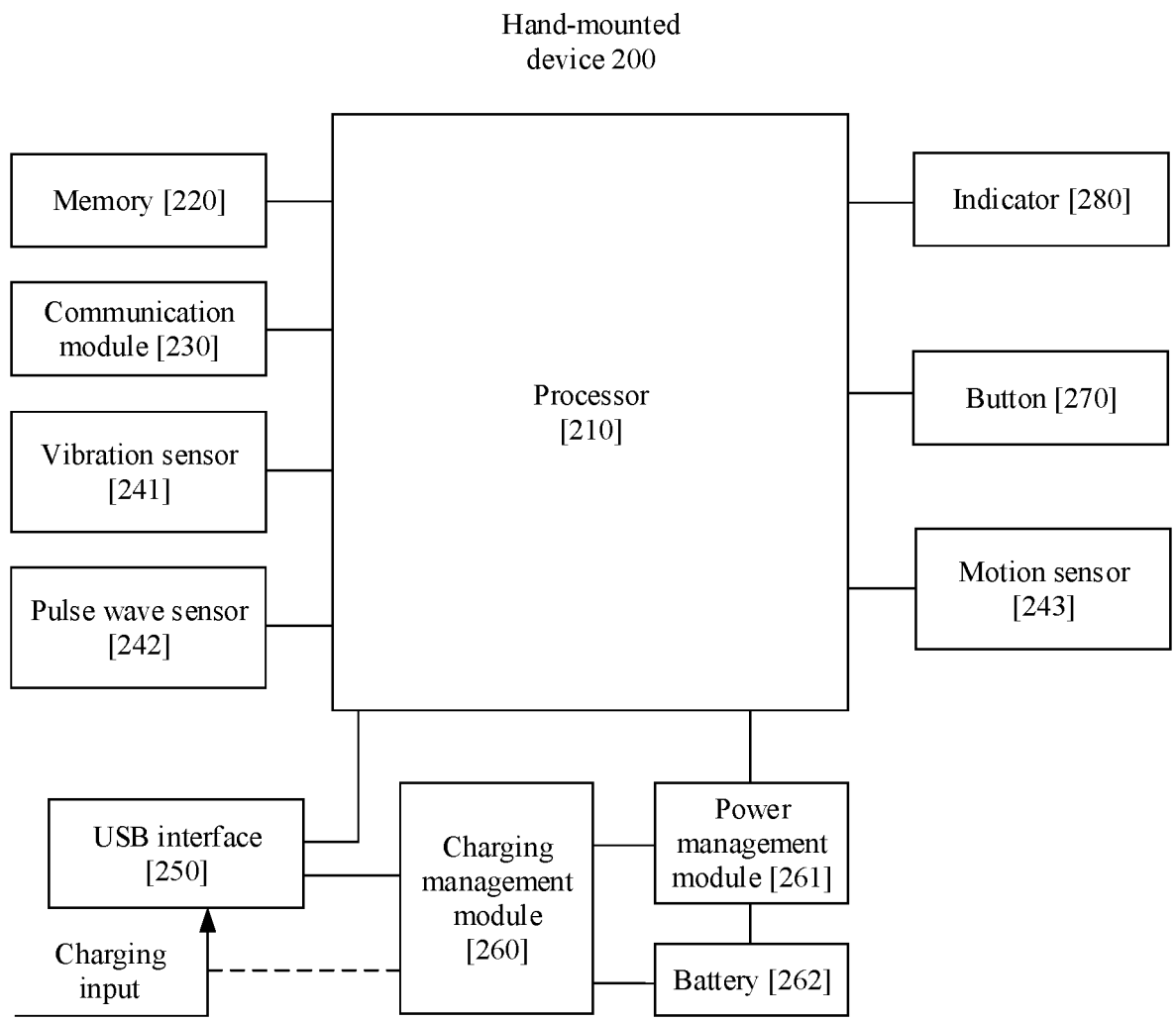
FIG. 3 is a schematic diagram of a functional structure of a hand-mounted device according to an embodiment of this application.

FIG. 3 is a schematic diagram of a functional structure of a hand-mounted device 200 according to an embodiment of this application. As shown in FIG. 3, the hand-mounted device 200 may include a processor 210, a memory 220, a communication module 230, a vibration sensor 241, a pulse wave sensor 242, a motion sensor 243, a USB interface 250, a charging management module 260, a power management module 261, a battery 262, a button 270, an indicator 280, and the like.

It may be understood that the structure shown in this embodiment of this application does not constitute a specific limitation on the hand-mounted device 200. In some other embodiments of this application, the hand-mounted device 200 may include more or fewer components than those shown in the figure, some components may be combined, some components may be split, or different component arrangements may be used. The components shown in the figure may be implemented in hardware, software, or a combination of software and hardware.

The processor 210 may include one or more processing units. A memory may be further disposed in the processor 210, and is configured to store instructions and data. In some embodiments, the memory in the processor 210 is a cache memory.

The memory 220 may be configured to store computer-executable program code, where the executable program code includes instructions. The processor 210 executes various function applications and data processing of the hand-mounted device 200 by running instructions stored in the memory 220.

The communication module 230 may provide a wireless communication solution that is applied to the hand-mounted device 200 and wireless communication solution includes a WLAN (such as a Wi-Fi network), Bluetooth, NFC, IR, or the like. The communication module 230 may be one or more components integrating at least one communication processing module.

The vibration sensor 241 may be a piezoelectric sensor, an optical sensor, a motion sensor, or the like that can detect a biological vibration wave signal.

The pulse wave sensor 242 is configured to detect a pulse wave signal of a hand or an arm of the user, and the pulse wave sensor 242 may be disposed on a side that is of the hand-mounted device and that faces skin of the user. The pulse wave sensor 242 may be specifically a piezoelectric sensor, or may be a photoelectric volume sensor or another sensor that may measure a pulse wave signal. The pulse wave signal collected by the piezoelectric sensor is a pressure pulse wave signal, and the pulse wave signal collected by the photoelectric volume sensor is a photoplethysmograph (Photoplethysmograph, PPG) signal. The piezoelectric sensor may be specifically a piezoelectric thin film sensor, a piezoelectric ceramic sensor, or the like. The photoelectric volume sensor may be specifically implemented by using a light emitting diode and a photodiode.

The motion sensor 243 may be a 3-axis accelerator (accelerator, ACC), a 3-axis gyroscope (gyroscrope), or a 6-axis/9-axis inertial measurement unit (Inertial measurement unit, IMU). In an embodiment of this application, the motion sensor 243 uses an IMU to improve detection accuracy, and the vibration sensor 241 may also use a same IMU to improve structural complexity of the hand-mounted device.

The USB interface 250 is an interface that conforms to a USB standard specification, and may specifically be a mini USB interface, a micro USB interface, a USB Type-C interface, or the like. The USB interface 250 may be configured to connect to a charger to charge the hand-mounted device 200, or may be configured to perform data transmission between the hand-mounted device 200 and a peripheral device. The interface may further be configured to connect to another hand-mounted device 200.

The charging management module 260 is configured to receive a charging input from the charger. The charger may be a wireless charger or a wired charger. In some embodiments of wired charging, the charging management module 260 may receive a charging input from the wired charger through the USB interface 250. In some embodiments of wireless charging, the charging management module 260 may receive a wireless charging input through a wireless charging coil of the hand-mounted device 200. When charging the battery 262, the charging management module 260 may further supply power to the terminal device by using the power management module 261.

The power management module 261 is configured to connect to the battery 262, the charging management module 260, and the processor 210. The power management module 261 receives an input of the battery 262 and/or the charging management module 260, and supplies power to the processor 210, the memory 220, the communication module 230, the camera 142, and the like. The power management module 261 may further be configured to monitor parameters such as a battery capacity, a battery cycle count, and a battery health status (electric leakage or impedance). In some other embodiments, the power management module 261 may alternatively be disposed in the processor 210. In some other embodiments, the power management module 261 and the charging management module 260 may alternatively be disposed in a same device.

The button 270 includes a power button, and the like. The button 270 may be a mechanical button, or may be a touch-sensitive button. The hand-mounted device 200 may receive a button input, and generate a button signal input related to a user setting and function control of the hand-mounted device 200.

The indicator 280 may be an indicator light, and may be configured to indicate a charging status and a power change, or may be configured to indicate a message, and the like.

In this embodiment, the vibration sensor 241 on the hand-mounted device 200 may detect a biological vibration wave signal generated when a target finger performs an action such as tapping or pinching. The pulse wave sensor 242 may detect a pulse wave signal of a hand or an arm when the target finger performs an action such as tapping or pinching. The IMU (that is, the motion sensor 243) may detect an acceleration signal of a hand of a user when the target finger performs an action such as tapping or pinching, and further detect information such as an angular velocity and a geomagnetic field of the hand of the user. Correspondingly, the IMU may include a three-axis accelerometer, or may include a three-axis gyroscope and a three-axis magnetic sensor, to detect an acceleration, an angular velocity, and a geomagnetic field of the hand of the user respectively. When the hand-mounted device 200 is a finger-mounted device, the target finger may be a finger that is of the user and on which the finger-mounted device is mounted, and the pulse wave sensor 242 may detect a pulse wave signal of the target finger. When the hand-mounted device 200 is an arm-mounted device, the target finger may be any finger, for example, an index finger, that is of the hand and on which the hand-mounted device 200 is mounted, and the pulse wave sensor 242 may detect a pulse wave signal of an arm of the user.

A short-range communication connection may be established between the hand-mounted device 200 and the communication module 130 of the head-mounted display device 100 by using the communication module 230. After the connection is established, the hand-mounted device 200 may send corresponding waveform data or a feature to the head-mounted display device 100 after the pulse wave sensor and/or the vibration sensor detect/detects a related signal (referred to as a target sensor signal herein). The head-mounted display device 100 may determine an input trigger event based on the waveform data or the feature, to detect a tap action. The hand-mounted device 200 may further transmit hand motion tracking data collected by the IMU, such as linear acceleration and an angular velocity, to the head-mounted display device 100. The head-mounted display device 100 may collect hand image tracking data of the user by using the camera at the same time, the hand motion tracking data collected by the IMU and the hand image tracking data collected by the camera are fused, and then determine and display an input result. The head-mounted display device 100 detects the tap action by using the signal detected by the pulse wave sensor and/or the vibration sensor. This can avoid blocking of a hand occurred when a touch operation of the user is sensed based on the camera, and thus improve accuracy of an input recognition result. Besides, when determining the input result, the head-mounted display device 100 fuses, for determining, the hand motion tracking data collected by the IMU and the hand image tracking data collected by the camera. This can also overcome drift caused by an accumulated error of the IMU, improve robustness of tracking precision, and further improve accuracy of the determined input recognition result. In addition, a sampling frequency of the IMU is usually far higher than a frame rate of the camera, and complexity of a signal processing algorithm is relatively low. Therefore, the head-mounted display device 100 determines the input result by using a signal collected by the IMU. This can also reduce an output delay, and improve real-time experience of gesture input of the user.

In some implementations, a sampling frequency of the IMU may be higher than 100 Hz, so that accuracy of recognition is improved and an output delay is reduced to meet a requirement for detection of a quick tap action.

For each input operation of the user, the hand-mounted device 200 and the head-mounted display device 100 may determine an input result through the foregoing interaction process. The following describes an input process corresponding to one input operation of the user.

Figure 4:
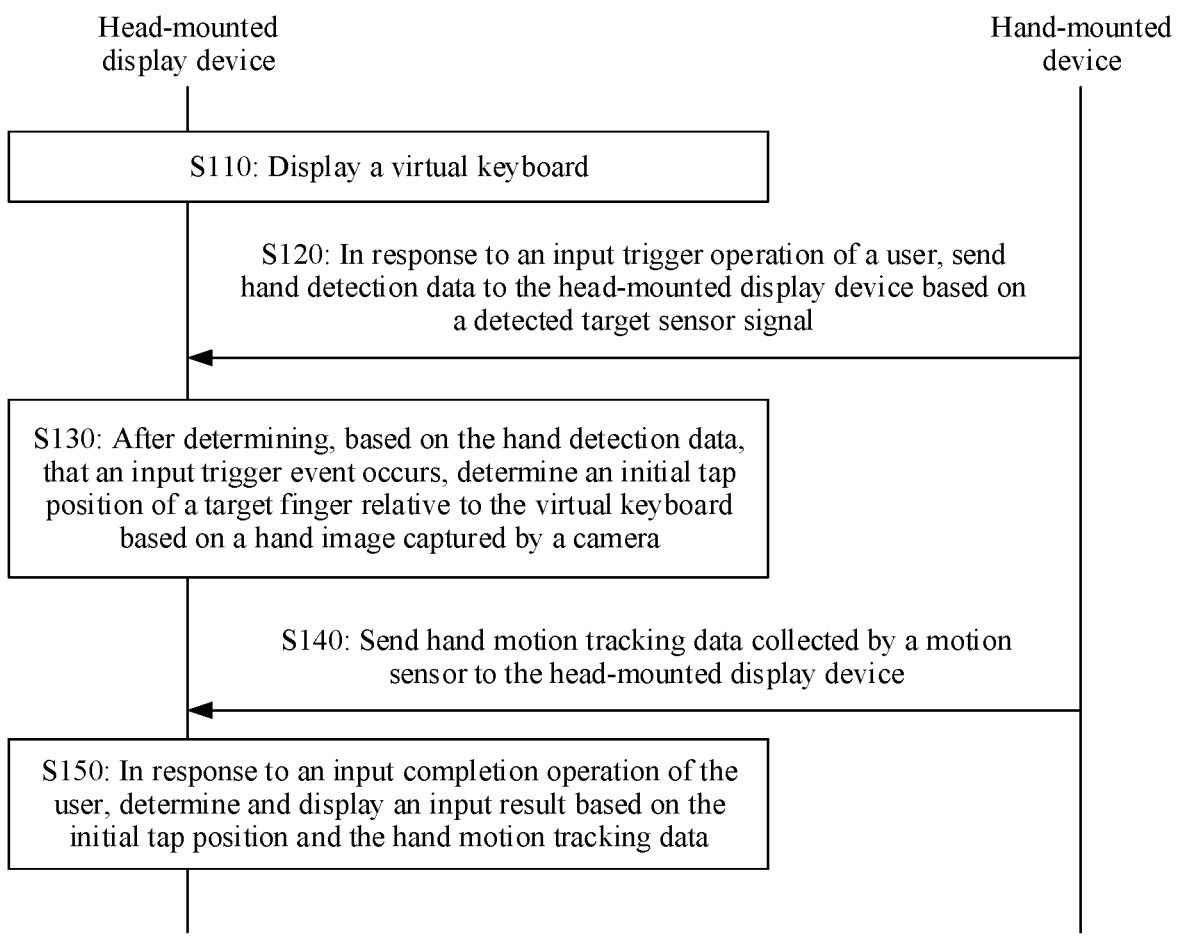
FIG. 4 is a schematic flowchart of an interaction method according to an embodiment of this application.

FIG. 4 is a schematic flowchart of an interaction method according to an embodiment of this application. As shown in FIG. 4, the method may include the following steps.

S110: A head-mounted display device displays a virtual keyboard.

As described above, the head-mounted display device may provide a virtual scene for a user to interact with, and the virtual scene may include content such as a virtual keyboard as an interaction interface for the user to complete input based on a gesture.

Specifically, the head-mounted display device may display the virtual keyboard by using a three-dimensional reconstruction algorithm such as a monocular vision-based simultaneous localization and mapping (simultaneous localization and mapping, SLAM) algorithm or a structure from motion (Structure From Motion, SFM) algorithm. The used three-dimensional reconstruction algorithm is not specifically limited in this embodiment.

A rendering position of the virtual keyboard is on a physical plane, for example, on a desktop or a wall. Alternatively, a rendering position of the virtual keyboard may be in the air, for example, on a spatial plane that is 30 cm in front of the field of view of the user.

The virtual keyboard may be a virtual keyboard in a QWERTY layout, or may be a virtual keyboard in another layout, for example, a portable terminal keyboard.

S120: In response to an input trigger operation of the user, the hand-mounted device sends hand detection data to the head-mounted display device based on a detected target sensor signal.

Specifically, the user may perform an input operation on the virtual keyboard, and the input operation may be a tap operation or a sliding operation.

When the user performs an input operation, the input operation may be implemented by using a single finger, or may be implemented by using a plurality of fingers. For example, when the virtual keyboard is located in a virtual space, the user may perform a tap or sliding input by using a two-finger pinch operation. In this way, the user may feel tactile feedback, and input experience of the user may be improved to some extent. For the input operation implemented by using the plurality of fingers, the two-finger pinch operation is more convenient for the user to operate. In this embodiment, the two-finger pinch operation is also used as an example for description subsequently.

For an input operation implemented by a single finger, the tap operation may be a tap operation of a target finger on a physical plane on which the virtual keyboard is located, and the sliding operation may be an operation that the target finger taps a button on the physical plane, slides to another button, and then is lifted up. A start operation (that is, an input trigger operation) of one input operation is an operation that the target finger taps the virtual keyboard on the physical plane, and an input completion operation is an operation that the target finger moves away from the virtual keyboard on the physical plane.

For an input operation implemented by a plurality of fingers, the tap operation may be a pinch operation performed by the target finger and another finger (for example, a thumb) on a key on the virtual keyboard, and the sliding operation may be an operation that the target finger and another finger are pinched together at a button on the virtual keyboard, slide to another button, and then are moved apart. In other words, the pinch operation may be considered as a tap operation performed by the target finger on a button corresponding to a pinch position. An input trigger operation of one input operation is an operation of pinching the target finger and the thumb together, and an input completion operation is an operation of moving the target finger and the thumb apart.

When the user taps the virtual keyboard on the physical plane or pinches two fingers together on the virtual keyboard to implement the input trigger operation, the target finger vibrates. Accordingly, a vibration sensor on the hand-mounted device may detect a biological vibration wave signal. In addition, when the user performs the foregoing input trigger operation, the blood flow also changes. Accordingly, a pulse wave sensor on the hand-mounted device detects that a pulse wave signal changes.

The hand-mounted device may send, to the head-mounted display device as hand detection data, the target sensor signal detected by the vibration sensor and/or the pulse wave sensor, so that the head-mounted display device determines an input trigger event and triggers a gesture input detection process. Using a single target sensor signal to determine the input trigger event may reduce complexity of an algorithm, and only one of the sensors needs to be disposed on the hand-mounted device. Therefore, structural complexity of the hand-mounted device may also be reduced. In addition, using the target sensor signals detected by the vibration sensor and the pulse wave sensor to determine the input trigger event may improve accuracy of a detection result. In specific implementation, a single sensor or a plurality of sensors may be selected based on a requirement. This is not specifically limited in this embodiment.

Considering that the hand of the user may also vibrate when being slightly collided, to improve accuracy of gesture input triggering detection, in this embodiment, a gesture input detection process of the head-mounted display device may be triggered when the target sensor signal meets a preset requirement.

A process of determining whether the target sensor signal meets the preset requirement may be performed on the head-mounted display device, or may be performed on the hand-mounted device. If the determining process is performed on the head-mounted display device, the hand-mounted device only needs to continuously send original data to the head-mounted display. In this way, device complexity of the hand-mounted device may be reduced to some extent. If the determining process is performed on the hand-mounted device, when sending the hand detection data, the hand-mounted device may send a determining result only when the target sensor signal meets the preset requirement. In this way, an amount of data transmitted between the hand-mounted device and the head-mounted display device can be reduced. Therefore, transmission efficiency can be improved, and transmission power consumption of the hand-mounted device can be reduced. An execution subject of the foregoing determining process may be specifically selected based on a requirement. This is not specifically limited in this embodiment. In this embodiment, an example in which the hand-mounted device performs the determining process is used for description.

During specific determining, the hand-mounted device may perform feature extraction on the target sensor signal detected by the vibration sensor and/or the pulse wave sensor, and when the extracted target signal feature meets the preset requirement, send indication information to the head-mounted display device as the hand detection data.

Figure 5:
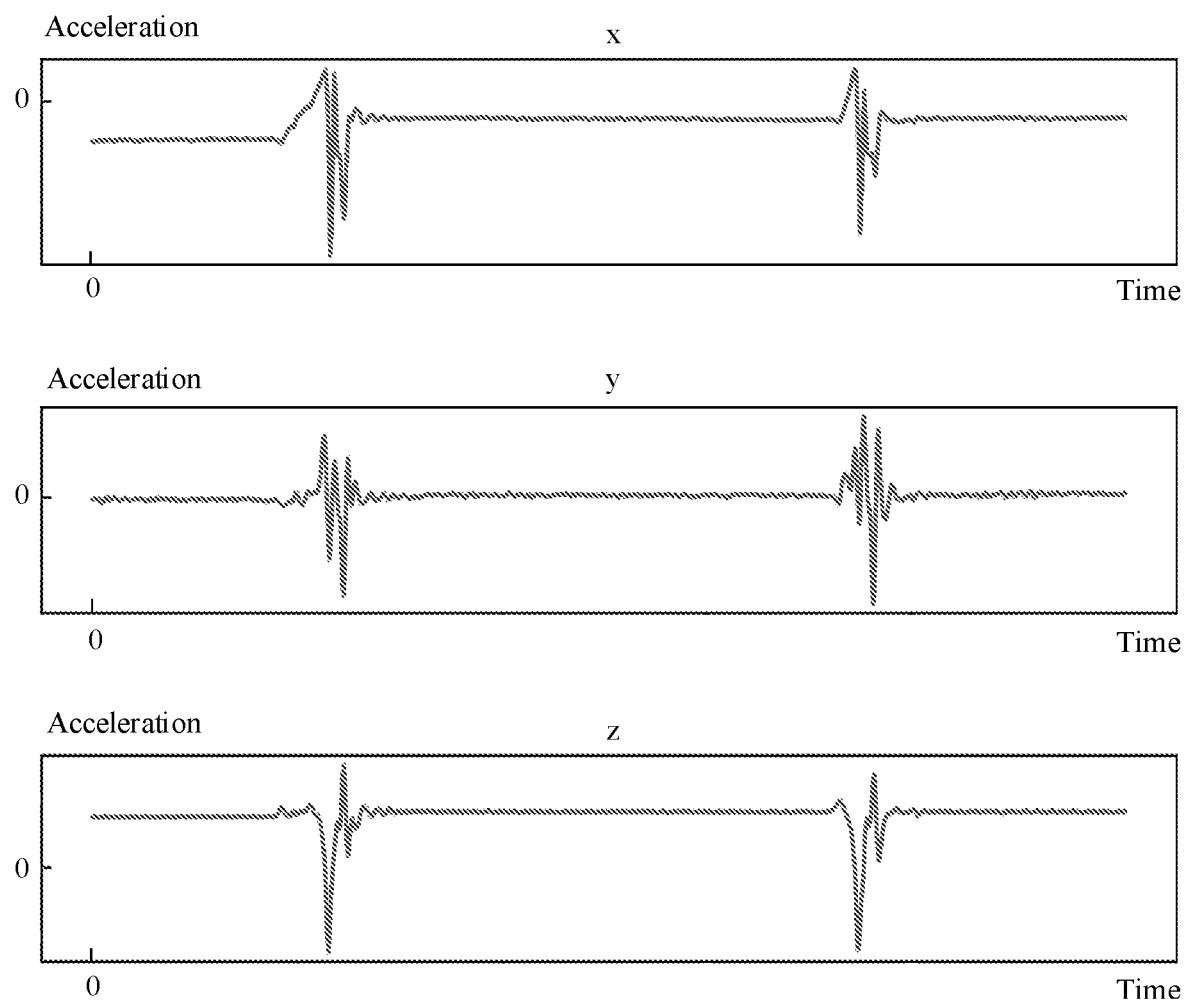
FIG. 5 is a schematic diagram of a biological vibration wave signal according to an embodiment of this application.

For example, the vibration sensor is an IMU. FIG. 5 is a schematic diagram of a biological vibration wave signal according to an embodiment of this application. The figure shows waveform diagrams corresponding to an x-axis, a y-axis, and a z-axis of a 3-axis accelerometer in the IMU when a target finger taps twice on a virtual keyboard on a desktop. In each waveform diagram, a horizontal coordinate represents time or a sampling point, and a vertical coordinate represents an electrical signal that may indicate acceleration. In FIG. 5, an example in which the horizontal coordinate represents time, and the vertical coordinate represents acceleration is used for description.

As shown in FIG. 5, when the target finger vibrates, a waveform of an acceleration signal detected by the IMU changes, and the hand-mounted device may periodically detect, in a preset time window (for example, one second), whether a waveform feature of the acceleration signal meets a preset requirement.

Specifically, the waveform feature of the acceleration signal may include a time domain feature (for example, amplitudes, mean values, and variances of an x-axis, a y-axis, and a z-axis) and a transform domain feature (for example, a frequency domain feature, a gradient domain feature, and a wavelet domain feature). During feature extraction, a plurality of features (that is, a target signal feature) of these features may be selected, and then feature extraction is performed by using a related feature extraction algorithm. A specific feature extraction algorithm is not specifically limited in this embodiment.

Similar to the acceleration signal, the waveform feature of the pulse wave signal may also include a time domain feature and a transform domain feature. Some target signal features may be selected, and feature extraction is performed by using a related feature extraction algorithm. A specific feature extraction algorithm is not specifically limited in this embodiment.

After the feature extraction is completed, it may be determined whether the extracted target signal feature meets the preset requirement. A corresponding threshold may be set for each target signal feature. When each target signal feature meets a corresponding threshold requirement, it may be considered that the target signal feature meets the preset requirement. Alternatively, a quantity of target signal features that meet the threshold requirement may be counted, and when the quantity meets a preset quantity, it is considered that the target signal feature meets the preset requirement. The two determining methods are merely described by using examples, and are not intended to limit this application. In specific implementation, another determining method may be used based on a requirement. This is not specifically limited in this application. In addition, if the vibration sensor is another sensor such as a piezoelectric sensor or an optical sensor, whether the biological vibration wave signal meets the preset requirement may also be determined based on a waveform feature. A specific determining method is similar to the foregoing determining method, and details are not described herein.

If the target signal feature meets the preset requirement, the hand-mounted device may send corresponding indication information to the head-mounted display device, where the indication information may be used as hand detection data and sent to the head-mounted display device by using a Bluetooth data packet.

Specifically, a target field may be added to the Bluetooth data packet, and the indication information may be carried in the target field. For example, the target field may be added to a protocol data unit (protocol data unit. PDU) field of the Bluetooth data packet, and "1" is used in the target field to represent the indication information. Accordingly, after receiving the data packet, the head-mounted display device may consider that the biological vibration wave signal meets the preset requirement when determining that the value of the target field is 1.

To improve reliability of data transmission, the hand-mounted device may perform error correction coding on the hand detection data and then add the hand detection data to the Bluetooth data packet. An error correction coding technology may use parity check coding, convolutional coding, reed-solomon (reed-solomon, RS) coding, cyclical redundancy check (cyclical redundancy check. CRC) coding, or the like.

S130: After determining, based on the hand detection data, that an input trigger event occurs, the head-mounted display device determines an initial tap position of a target finger relative to the virtual keyboard based on a hand image captured by a camera.

After receiving the Bluetooth data packet, the head-mounted display device may perform error correction check and decoding on data carried in the data packet, to obtain hand detection data (for example, the foregoing indication information). When determining, based on the hand detection data, that the target sensor signal meets the preset requirement, it is determined that an input trigger event occurs. In this case, a gesture input detection process may be triggered, and the hand image is captured by the camera, to determine an input result. In this way, some processing energy consumption can be reduced. In addition, when a camera for capturing a physical environment is different from a camera for capturing the hand image, the head-mounted display device may start the camera for capturing the hand image again when determining that the target sensor signal meets the preset requirement. This can also reduce energy consumption.

Considering that the input trigger operation of the user may be located outside the virtual keyboard area, in this embodiment, the head-mounted display device may further determine, after receiving the hand detection data, whether the input trigger operation of the user acts on the virtual keyboard. If the input trigger operation of the user acts on the virtual keyboard, trigger a gesture input detection process. In this way, recognition of a subsequent input result may be facilitated, and energy consumption can also be reduced.

Specifically, the head-mounted display device may determine, based on the hand image captured by the camera, whether the finger end of the target finger points to the area of the virtual keyboard. If the finger end of the target finger points to the area of the virtual keyboard, it may be considered that the input trigger operation of the user acts on the virtual keyboard.

As described above, the hand of the user may also vibrate when being slightly collided. To further improve accuracy of gesture input trigger detection, in this embodiment, the head-mounted display device may also determine, based on the hand image captured by the camera, whether the hand that is of the user and on which the hand-mounted device is mounted is in a target gesture, and when it is determined that the hand that is of the user and on which the hand-mounted device is mounted is in the target gesture, trigger a gesture input detection process of the head-mounted display device to determine a subsequent input result.

The target gesture may be, for example, a pointing gesture in which an index finger extends or another finger bends, or a gesture in which the index finger pinches the thumb. Specifically, the target gesture may be set based on a requirement. This is not specifically limited in this embodiment. To facilitate usage of the user, the head-mounted display device may also provide a gesture customization function for the user to customize the target gesture.

If the gesture input detection process is triggered, the head-mounted display device may further recognize, from the hand image captured by the camera, the initial tap position of the target finger relative to the virtual keyboard. Specifically, various related image recognition algorithms may be used. This is not specifically limited in this embodiment.

S140: The hand-mounted device sends hand motion tracking data collected by a motion sensor to the head-mounted display device.

After sending the hand detection data to the head-mounted display device, the hand-mounted device may continue to send the hand motion tracking data collected by the motion sensor to the head-mounted display device, so that the head-mounted display device recognizes an input result. The hand motion tracking data may include a series of local coordinates collected by the motion sensor.

S150: In response to an input completion operation of the user, the head-mounted display device determines and displays an input result based on the initial tap position and the hand motion tracking data.

When the hand-mounted device is a finger-mounted device, the head-mounted display device may recognize, based on the received hand motion tracking data, whether the user performs an input completion operation, that is, recognize whether the user completes the current input operation. If the user completes the current input operation, the head-mounted display device may continue to determine the input result.

Specifically, as described above, the input completion operation may be an operation that the target finger moves away from the virtual keyboard on the physical plane, or an operation that the target finger and the thumb are released. Based on a motion trajectory of the target finger in the hand motion tracking data, whether the user completes the current input operation may be determined.

It may be understood that a process of determining whether the user completes the current input operation may also be performed on the hand-mounted device. Accordingly, when determining that the user completes the current input operation, the hand motion tracking data sent by the hand-mounted device to the head-mounted display device may carry indication information indicating that the input completes. An implementation of the indication information is similar to that of the indication information indicating that the target signal feature meets the preset requirement, and may be represented by using a preset field. For example, the foregoing target field may continue to be used, and when the field value is 2, it indicates that the input completes. Further, when determining that the user completes the current input operation, the hand-mounted device may suspend sending the hand motion tracking data to the head-mounted display device, to reduce transmission energy consumption. In addition, as described above, the input operation of the user may be a tap operation or a sliding operation. If the input operation is a tap operation, the hand motion tracking data is the indication information indicating that the input completes. If the input operation is a sliding operation, the hand motion tracking data may further include data collected by the IMU in a sliding process of the target finger.

When specifically determining an input result, if the input operation is a tap operation, after determining, based on the hand motion tracking data, that the user completes the current input operation, the head-mounted display device may determine the input result based on the initial tap position and the keyboard layout of the virtual keyboard.

If the input operation is a sliding operation, after determining, based on the hand motion tracking data, that the user completes the current input operation, the head-mounted display device may determine the input result based on the initial tap position, the hand motion tracking data and the keyboard layout of the virtual keyboard.

When the hand-mounted device is an arm-mounted device, for an input completion operation in which the target finger moves away from the virtual keyboard on the physical plane, the head-mounted display device may determine, based on a motion trajectory of the target finger in the hand motion tracking data, whether the user completes the current input operation, and after determining that the user completes the current input operation, continue to determine the input result. For an input completion operation in which the target finger and the thumb are released, the user may perform the operation with a specific release force. In this case, the hand of the user also generates a biological vibration wave signal. The head-mounted display device may determine, based on the biological vibration wave signal detected by the hand-mounted device, whether the user completes the input operation. A specific detection process is similar to a detection process of the input trigger operation, and details are not described herein. In a determining process, the head-mounted display device may distinguish, based on a quantity of times and/or a signal feature (for example, an amplitude) of the detected biological vibration wave signal, whether to perform the input trigger operation or the input completion operation. Similar to the input trigger operation, when the user performs the input completion operation with a specific release force, a blood flow of the hand of the user also changes. The head-mounted display device may also determine, based on the pulse wave signal detected by the hand-mounted device, whether the user completes the input operation. A specific determining process is similar to a determining process corresponding to the biological vibration wave signal, and details are not described herein.

To facilitate usage of the user, for an input completion operation in which the target finger and the thumb are released, the head-mounted display device may also determine, through recognition based on the hand image captured by the camera, whether the user completes the current input operation. Specifically, the head-mounted display device may determine, through recognition based on the hand image, whether the target finger and the thumb are in a gesture of being moved apart, and when determining through recognition that the target finger and the thumb are moved apart, determine that the user completes the current input operation, and then determine an input result.

To improve accuracy of the determined input result, in this embodiment, in step S130, after receiving the hand detection data, the head-mounted device may collect hand image tracking data of the user by using the camera when determining that the input trigger operation of the user acts on the virtual keyboard, that is, the hand image captured by the camera may include the hand image tracking data. Accordingly, when determining the input result, the head-mounted display device may perform data fusion on the hand image tracking data collected by the camera and the hand motion tracking data collected by the IMU, and then determine the input result based on the motion tracking data that is of the target finger and that is obtained by fusion and with reference to the initial tap position and the keyboard layout of the virtual keyboard.

The hand image tracking data includes image tracking data of a target part (for example, a finger key point such as a fingertip or a finger joint) on the target finger and image tracking data of the hand-mounted device. The head-mounted display device may extract the image tracking data of the target part or the hand-mounted device from the hand image tracking data to determine an input result, to improve processing efficiency. In addition, a visual marker (for example, an LED light, a QR code, or a pattern) may be provided on the hand-mounted device. The image tracking data of the hand-mounted device may include image tracking data of the visual marker. The head-mounted display device may extract the image tracking data of the visual marker from the hand image tracking data to determine an input result, to further improve processing efficiency.

When data fusion is performed, a data fusion algorithm such as Kalman filtering or maximum likelihood estimation may be used, for example, a visual inertia mileage calculation method such as Kalman filtering under multi-state constraint, to fuse hand image tracking data and hand motion tracking data. A specific data fusion algorithm is not specifically limited in this embodiment.

The input result may be specifically determined with reference to a language model (for example, an N-Gram language model). Specifically, various related keyboard-based gesture input algorithms may be used. This is not specifically limited in this embodiment.

Figure 6:
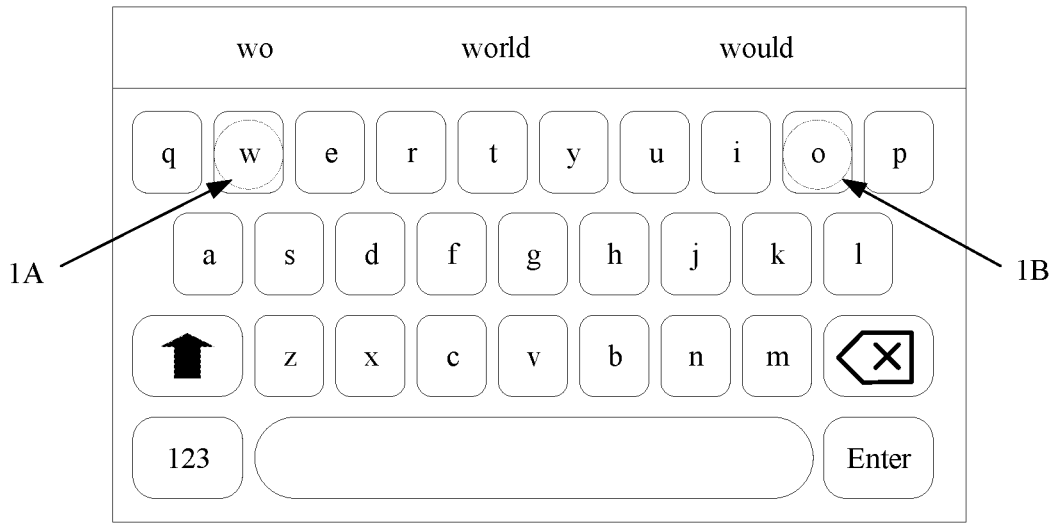
FIG. 6 is a schematic diagram of an input result according to an embodiment of this application.

FIG. 6 is a schematic diagram of an input result according to an embodiment of this application. The figure shows an input result of a tap operation of a user. As shown in FIG. 6, after the user inputs the character string "hello", the user successively taps positions 1A and 1B (represented by dashed circles in the figure) by performing two tap operations. For the second tap operation, the head-mounted display device may determine various candidate input results: wo, world, and would based on an initial tap position, a keyboard layout of a virtual keyboard, and an N-Gram language model. The user may further select a final input result from these candidate input results.

Figure 7:
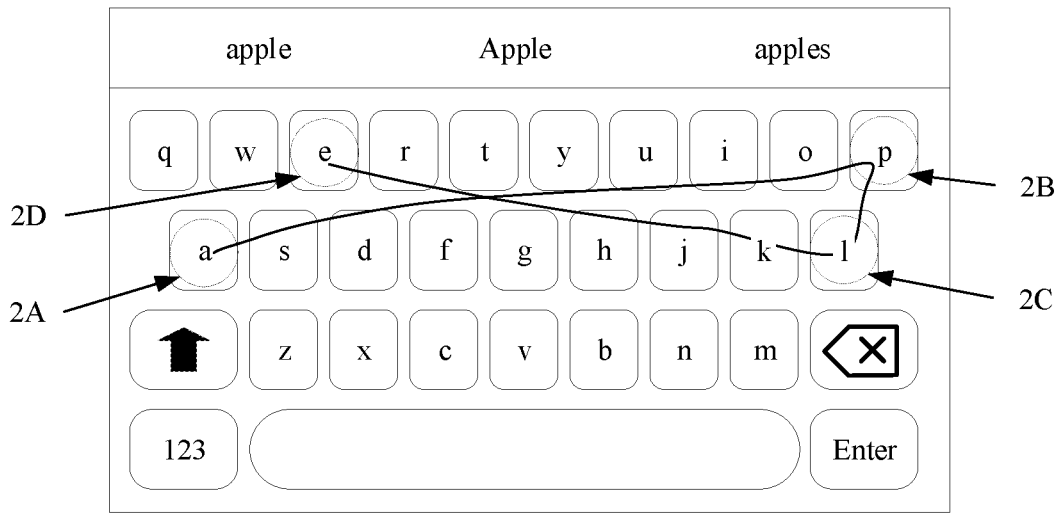
FIG. 7 is a schematic diagram of another input result according to an embodiment of this application.

FIG. 7 is a schematic diagram of another input result according to an embodiment of this application. The figure shows an input result of a sliding operation of a user. As shown in FIG. 7, a position 2A represents a start position (that is, an initial tap position) of a sliding gesture, positions 2B and 2C represent positions that the sliding gesture passes through, and a position 2D represents a position at which the sliding gesture completes. The head-mounted display device may determine, based on motion tracking data of a target finger, a motion trajectory and some motion features of the target finger, and then may determine various candidate input results: apple, Apple, and apples with reference to a keyboard layout of a virtual keyboard and an N-Gram language model. The user may further select a final input result from the candidate input results.

A person skilled in the art may understand that the foregoing embodiments are examples, but are not intended to limit this application. In a possible case, an execution sequence of one or more steps in the foregoing steps may be adjusted, or may be selectively combined to obtain one or more other embodiments. For example, there is no strict execution time and sequence relationship between a process of determining the initial tap position in step S130 and step S150, and the process of determining the initial tap position may also be implemented in a process of responding to the input completion operation by the head-mounted display device. A person skilled in the art may select any combination from the foregoing steps based on a requirement, and any combination that does not depart from the essence of the solutions of this application shall fall within the protection scope of this application.

According to the interaction method provided in this embodiment, the head-mounted display device may display the virtual keyboard, the hand-mounted device may send hand detection data to the head-mounted display device after detecting the target sensor signal, and the head-mounted display device may determine the input trigger event based on the hand detection data, to implement detection of a tap action. The hand-mounted device may further transmit the hand motion tracking data collected by the motion sensor to the head-mounted display device. The head-mounted display device may capture the hand image of the user by using the camera, and determine and display the input result based on the hand motion tracking data collected by the motion sensor and the hand image. In the foregoing solution, the tap action is detected by using the signal detected by the vibration sensor or the pulse wave sensor, and the input result is determined based on the hand motion tracking data collected by the motion sensor. This can avoid blocking of a hand, and thus improve accuracy of the determined input result. In addition, a sampling frequency of the motion sensor is usually far higher than a frame rate of the camera, and complexity of a signal processing algorithm is relatively low. Therefore, the input result is determined by using a signal collected by the motion sensor. This can also reduce an output delay, and improve real-time experience of gesture input of the user.

Based on a same inventive concept, as an implementation of the foregoing method, the embodiments of this application provide an interaction apparatus. The apparatus embodiment corresponds to the foregoing method embodiment. For ease of reading, details in the foregoing method embodiment are not described one by one in the apparatus embodiment. However, it should be clear that the apparatus in this embodiment can correspondingly implement all the contents in the foregoing method embodiment.

Figure 8:
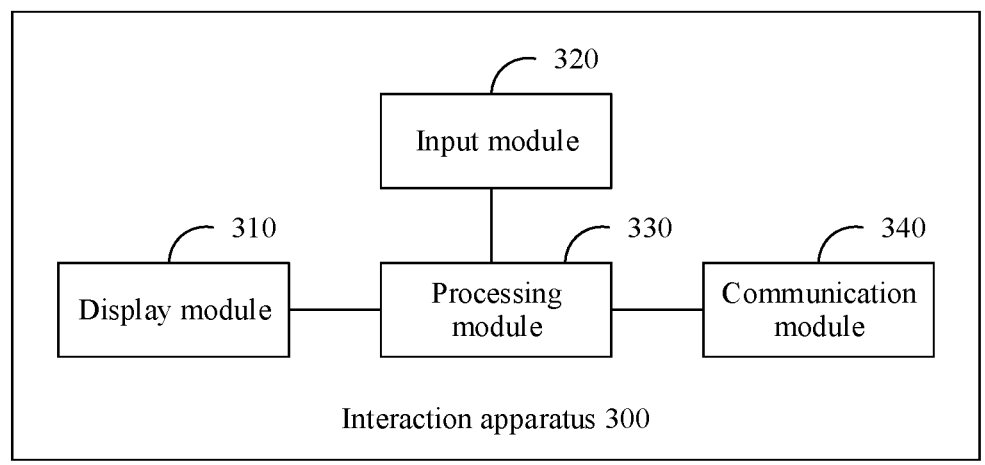
FIG. 8 is a schematic diagram of a structure of an interaction apparatus according to an embodiment of this application.

FIG. 8 is a schematic diagram of a structure of an interaction apparatus according to an embodiment of this application. The apparatus may be applied to a head-mounted display device. As shown in FIG. 8, the interaction apparatus 300 provided in this embodiment may include a display module 310, an input module 320, a processing module 330, and a communication module 340).

The display module 310 is configured to support the head-mounted display device in performing the display operation in step S110 in the foregoing embodiment and/or another process of the technology described in this specification. The display module may be a touchscreen, other hardware, or a combination of hardware and software.

The input module 320 is configured to receive an input operation, such as voice input or gesture input, performed by a user on the head-mounted display device, and/or is configured to perform another process of the technology described in this specification. The input module may be a touchscreen, other hardware, or a combination of hardware and software.

The processing module 330 is configured to support the head-mounted display device in performing the processing operation in step S130 in the foregoing embodiments, S150, and/or another process of the technology described in this specification.

The communication module 340 is configured to support the head-mounted display device in performing the operation of receiving hand detection data in step S130 in the foregoing embodiments, and/or another process of the technology described in this specification.

The apparatus provided in this embodiment may perform the foregoing method embodiment. An implementation principle and a technical effect of the apparatus are similar to those of the method embodiment. Details are not described herein.

Figure 9:
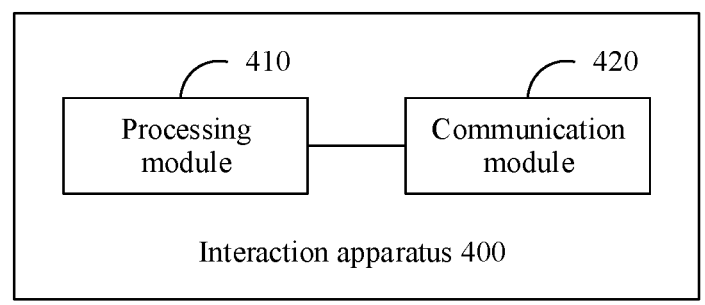
FIG. 9 is a schematic diagram of a structure of another interaction apparatus according to an embodiment of this application.

FIG. 9 is a schematic diagram of a structure of another interaction apparatus according to an embodiment of this application. The apparatus may be applied to a hand-mounted device. As shown in FIG. 9, the interaction apparatus 400 provided in this embodiment may include a processing module 410 and a communication module 420.

The processing module 410 is configured to support the hand-mounted device in performing the processing operation in the foregoing embodiments, and/or another process of the technology described in this specification.

The communication module 420 is configured to support the hand-mounted device in performing steps S120 and S140 in the foregoing embodiments, and/or another process of the technology described in this specification.

The apparatus provided in this embodiment may perform the foregoing method embodiment. An implementation principle and a technical effect of the apparatus are similar to those of the method embodiment. Details are not described herein.

Persons skilled in the art may clearly understand that, for the purpose of convenient and brief description, division into the foregoing function units or modules is merely used as an example for description. In an actual application, the foregoing functions may be allocated to different functional units or modules for implementation based on a requirement. That is, an inner structure of the apparatus is divided into different functional units or modules to implement all or some of the functions described above. Functional units and modules in the embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units or modules are merely for convenience of distinguishing from each other, and are not intended to limit the protection scope of this application. For a specific working process of the units or modules in the foregoing system, refer to a corresponding process in the foregoing method embodiments. Details are not described herein.

An embodiment of this application further provides a computer-readable storage medium, where the computer-readable storage medium stores a computer program. When the computer program is executed by a processor, the method in the foregoing method embodiment is implemented.

An embodiment of this application further provides a computer program product. When the computer program product is run on an electronic device, the electronic device is enabled to perform the method in the foregoing method embodiments. The electronic device may be the head-mounted display device or the hand-mounted device.

An embodiment of this application further provides a chip system. The chip system includes a processor, the processor is coupled to a memory, and the processor executes a computer program stored in the memory, to implement the method in the foregoing method embodiments. The chip system may be a single chip or a chip module including a plurality of chips.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedures or the functions according to embodiments of this application are all or partially generated. The computer may be a general-purpose computer, a dedicated computer, a computer network, or another programmable apparatus. The computer instructions may be stored in a computer-readable storage medium, or may be transmitted through the computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk. SSD)), or the like.

Persons of ordinary skill in the art may understand that all or some of the processes of the methods in the forgoing embodiments may be implemented by a computer program instructing relevant hardware. The program may be stored in a computer-readable storage medium. When the program is executed, the processes of the methods in the forgoing embodiments are performed. The foregoing storage medium may include any medium that can store program code, such as a ROM, a random access memory RAM, a magnetic disk, or an optical disc.

Names or numbers of steps in this application do not mean that the steps in the method procedure need to be performed in a time/logical sequence indicated by the names or numbers. An execution sequence of the steps in the procedure that have been named or numbered can be changed based on a technical objective to be implemented, provided that a same or similar technical effect can be achieved.

In the foregoing embodiments, the description of each embodiment has respective focuses. For a part that is not described in detail or recorded in an embodiment, refer to related descriptions in other embodiments.

In the embodiments provided in this application, it should be understood that the disclosed apparatus/device and method may be implemented in other manners. For example, the described apparatus/device embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

It should be understood that, in the specification and claims of this application, the terms "include", "contain" and any other variants mean to cover a non-exclusive inclusion, for example, a process, method, system, product, or device that includes a series of steps or modules is not necessarily limited to those steps or modules are clearly listed, but may include other steps or modules not expressly listed or inherent to such a process, method, product, or device.

In descriptions of this application. "/" represents an "or" relationship between associated objects unless otherwise specified. For example, A/B may represent A or B. In this application, "and/or" describes only an association relationship for describing associated objects and represents that three relationships may exist. For example. A and/or B may represent the following three cases: Only A exists, both A and B exist, and only B exists, where A and B may be singular or plural.

In addition, in the descriptions of this application, "a plurality of" means two or more than two unless otherwise specified. "At least one of the following" or a similar expression thereof refers to any combination of these items, including a singular item or any combination of plural items. For example, at least one of a, b, or c may represent a, b, c, a-b, a-c, b-c, or a-b-c, where a, b, and c may be singular or plural.

As used in the specification and the appended claims of this application, according to the context, the term "if" may be interpreted as "when" or "once" or "in response to determining" or "in response to detecting". Similarly, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the specification and the appended claims of this application, the terms "first", "second", "third", and the like are intended to distinguish between similar objects but do not necessarily indicate a specific order or sequence. It should be understood that the data termed in such a way are interchangeable in proper circumstances, so that embodiments described herein can be implemented in other orders than the order illustrated or described herein.

Reference to "an embodiment", "some embodiments", or the like described in the specification of this application indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily refer to a same embodiment. Instead, the statements mean "one or more but not all of embodiments", unless otherwise specifically emphasized in another manner.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A method applied to a first electronic device, wherein the first electronic device comprises a camera, and the method comprises:
    displaying, by the first electronic device, a virtual keyboard;
    in response to an input trigger operation of a user, receiving, by the first electronic device, hand detection data from a second electronic device;
    determining, by the first electronic device, an initial tap position of a target finger relative to the virtual keyboard based on a hand image captured by the camera after determining, based on the hand detection data, that an input trigger event occurs;
    receiving, by the first electronic device, hand motion tracking data from the second electronic device; and
    determining and displaying, by the first electronic device, an input result based on the initial tap position and the hand motion tracking data in response to an input completion operation of the user.

2. The method according to claim 1, wherein the hand image comprises hand image tracking data collected by the camera, and wherein determining and displaying the input result comprises:
    performing data fusion on the hand image tracking data and the hand motion tracking data to obtain motion tracking data of the target finger;
    determining the input result based on the initial tap position, the motion tracking data, a keyboard layout of the virtual keyboard, and a preset language model; and
    displaying the input result.

3. The method according to claim 2, wherein the hand image tracking data comprises image tracking data of a target part of the target finger or image tracking data of the second electronic device.

4. The method according to claim 1, wherein the method further comprises:
    in response to at least determining, based on the hand detection data, that a target sensor signal meets a preset requirement, determining, by the first electronic device, that the input trigger event occurs.

5. The method according to claim 1, wherein the method further comprises:
    in response to at least determining, based on the hand image captured by the camera, that the input trigger operation acts on the virtual keyboard, determining, by the first electronic device, that the input trigger event occurs.

6. The method according to claim 1, wherein the method further comprises:
    in response to at least determining, based on the hand image captured by the camera, that a hand of the user on which the second electronic device is mounted is in a target gesture, determining, by the first electronic device, that the input trigger event occurs.

7. The method according to claim 1, wherein a rendering position of the virtual keyboard is on a physical plane, the input trigger operation is an operation that the target finger taps the virtual keyboard on the physical plane, and the input completion operation is an operation that the target finger moves away from the virtual keyboard on the physical plane.

8. An interaction system, comprising:
a head-mounted display device; and
a hand-mounted device, wherein:
the head-mounted display device has a camera,
the hand-mounted device has a motion sensor, and
the hand-mounted device further has at least one of a vibration sensor or a pulse wave sensor, and wherein:
the head-mounted display device is configured to display a virtual keyboard;
the hand-mounted device is configured to send, in response to an input trigger operation of a user, hand detection data to the head-mounted display device based on a detected target sensor signal, wherein the target sensor signal comprises at least one of a biological vibration wave signal detected by the vibration sensor or a pulse wave signal detected by the pulse wave sensor;
the head-mounted display device is further configured to determine, after determining, based on the hand detection data, that an input trigger event occurs, an initial tap position of a target finger relative to the virtual keyboard based on a hand image captured by the camera;
the hand-mounted device is further configured to send hand motion tracking data collected by the motion sensor to the head-mounted display device; and
the head-mounted display device is further configured to determine and displaying, in response to an input completion operation of the user, an input result based on the initial tap position and the hand motion tracking data.

9. The system according to claim 8, wherein the hand image comprises hand image tracking data collected by the camera, and wherein the head-mounted display device is further configured to:
perform data fusion on the hand image tracking data and the hand motion tracking data to obtain motion tracking data of the target finger;
determine the input result based on the initial tap position, the motion tracking data, a keyboard layout of the virtual keyboard, and a preset language model; and
display the input result.

10. The system according to claim 9, wherein the hand image tracking data comprises image tracking data of a target part of the target finger or image tracking data of the hand-mounted device.

11. The system according to claim 10, wherein the hand-mounted device is provided with a visual marker, and the hand image tracking data comprises image tracking data of the visual marker.

12. The system according to claim 8, wherein the head-mounted display device is further configured to determine that the input trigger event occurs in response to at least determining, based on the hand detection data, that the target sensor signal meets a preset requirement.

13. The system according to claim 8, wherein a rendering position of the virtual keyboard is on a physical plane, the input trigger operation is an operation that the target finger taps the virtual keyboard on the physical plane, and the input completion operation is an operation that the target finger moves away from the virtual keyboard on the physical plane.

14. The system according to claim 8, wherein the input trigger operation is an operation of pinching the target finger and a thumb together, and the input completion operation is an operation of moving the target finger and the thumb apart.

15. The system according to claim 14, wherein a rendering position of the virtual keyboard is in the air.

16. The system according to claim 8, wherein the hand-mounted device is further configured to send the hand motion tracking data collected by the motion sensor to the head-mounted display device in response to a sliding input operation of the user.

17. The system according to claim 8, wherein the hand-mounted device is a finger-mounted device, and the target finger is a finger on which the hand-mounted device is mounted.

18. The system according to claim 8, wherein the vibration sensor and the motion sensor are a same inertial measurement unit (IMU), and the head-mounted display device communicates with the hand-mounted device through a Bluetooth connection.

19. An interaction method, applied to an interaction system, wherein the interaction system comprises a head-mounted display device and a hand-mounted device, the head-mounted display device has a camera, the hand-mounted device has a motion sensor, the hand-mounted device further has at least one of a vibration sensor or a pulse wave sensor, and the method comprises:
displaying, by the head-mounted display device, a virtual keyboard;
in response to an input trigger operation of a user, sending, by the hand-mounted device, hand detection data to the head-mounted display device based on a detected target sensor signal, wherein the target sensor signal comprises at least one of a biological vibration wave signal detected by the vibration sensor or a pulse wave signal detected by the pulse wave sensor;
after determining, based on the hand detection data, that an input trigger event occurs, determining, by the head-mounted display device, an initial tap position of a target finger relative to the virtual keyboard based on a hand image captured by the camera;
sending, by the hand-mounted device, hand motion tracking data collected by the motion sensor to the head-mounted display device; and
in response to an input completion operation of the user, determining and displaying, by the head-mounted display device, an input result based on the initial tap position and the hand motion tracking data.

20. The method according to claim 19, wherein the hand image comprises hand image tracking data collected by the camera, and wherein determining and displaying the input result comprises:
performing data fusion on the hand image tracking data and the hand motion tracking data to obtain motion tracking data of the target finger;
determining the input result based on the initial tap position, the motion tracking data, a keyboard layout of the virtual keyboard, and a preset language model; and
displaying the input result.

* * * * *